United States Patent Office 3,357,150
Patented Dec. 12, 1967

3,357,150
PROCESS FOR THE PREVENTION OF THE EVAPORATION OF ACTIVE INGREDIENTS ON THE BASE OF PHOSPHORUS-CONTAINING COMPOUNDS
Wolfgang Behrenz, Wuppertal-Elberfeld, Wolfgang Czerch, Leverkusen, and Otto Telle, Cologne-Stammheim, Germany, assignors to Farbenfabriken Bayer Aktiengesellschaft, Leverkusen, Germany, a corporation of Germany
No Drawing. Filed July 11, 1963, Ser. No. 294,225
Claims priority, application Germany, July 28, 1962, F 37,452
4 Claims. (Cl. 53—5)

The present invention relates to and has as its object a new and useful process for the prevention of the evaporation of active ingredients on the base of phosphorus-containing compounds, which comprises using as packing materials foils, bags or bottles of polyvinyl chloride.

Phosphorus-containing compounds, especially phosphoric acid esters to be used as pest control agents, have to be brought into a serviceable form by means of suitable inert carrier substances. Solvents, clay minerals, chalk, cellulose and the like are frequently used as such inert materials. In this way the insecticidal products are marketed in very different types of packing materials; often these preparations exhibit the disadvantage of permeating the packing material, thereby losing some of their activity. Moreover, the active ingredients escaping during storage of goods thus packed in storage rooms may cause strong inconvenience (odour) and even danger to human beings.

In order to obviate the loss of active ingredient during storage, various packing materials such as, for example, foils of metal, plastics or cellulose have already been proposed, used, or tested.

In accordance with the present invention it has now been found that, surprisingly, packing materials of polyvinyl chloride such as foils, bags and bottles can prevent the evaporation of gaseous or vaporous active ingredients of phosphorus-containing compounds to a much greater extent than other materials, for example polyethylene, polypropylene, polyamides, foils of cellulose acetate, etc. Polyvinyl chloride without additives of plasticiser has proved to be especially advantageous as packing material.

Insecticidally active phosphorus-containing compounds the escape of which can be prevented completely by the inventive process are, for example, dimethyl-2,2-dichlorovinyl phosphate, dithiophosphoric acid-S-2(ethylthio) ethyl-O,O-diethyl ester or O,O-dimethyl-S-(4-oxobenzotriazine-3-methyl)-phosphorus dithioate.

The permeability of various packing materials used for dimethyl-2,2-dichlorovinyl phosphate, measured by the letal time ($LT_{100}$) upon administration on Musca domestica (houseflies) can be seen from the following table.

(The letal time is the time, which is necessary for the complete destruction of all the test animals.)

| Foil material: | Escape rate |
|---|---|
| Foils of regenerated cellulose | minutes __ <60 |
| High-pressure polyethylene | hours __ 5 |
| Low-pressure polyethylene | do __ 5 |
| Polypropylene | days __ <3 |
| Polycarbonate | do __ <6 |
| Polyamide | do __ <4 |
| Polyvinyl alcohol | hours __ 3 |
| Polyvinyl chloride without plasticizer | [1] |

[1] No escape of active ingredient indicated even after 40 days.

The following examples are given for the purpose of illustrating the present invention but without limiting it in any way:

Example 1

For combating flies, plates of mechanical wood pulp impregnated with dimethyl-2,2-di-chlorovinyl phosphate are used. Due to the high vapour pressure of dimethyl-2,2-dichlorovinyl phosphate, the plates gradually lose their activity during storage. In order to retain the active ingredient in the plates, the latter were welded with foils of various plastic materials. Great differences were found with regard to the suitability of the various foil materials for checking the evaporation of the dimethyl-2,2-dichlorovinyl phosphate. The evaporation of dimethyl-2,2-di-chlorovinyl phosphate from the plates could only be prevented by the use of polyvinyl chloride without plasticiser additives. Because of the high activity of dimethyl-2,2-dichlorovinyl phosphate against flies, the escape through the other foils could be established by the test on flies.

Example 2

Dithiophosphoric acid-S-2(ethylthio)ethyl-O,O-diethyl ester in the form of a 5% granulate was packed in bags of polyethylene and polyvinyl chloride with and without plasticiser additives. The escape of active ingredient through the polyethylene is immediately noticeable by the odour and leads to strong inconvenience on storage in a closed storage room.

By contrast, an escape of active ingredient through the polyvinyl chloride bags could not be detected by odour. However, flies (Musca domestica) which were placed on the bags under a glass dish open at the bottom were destroyed on the bags of polyethylene to an extent of 100% in the course of 8 hours. In contradistinction, 50% of the flies were still alive after 24 hours on the bags of polyvinyl chloride with plasticiser. On the bags of polyvinyl chloride without plasticiser no flies were killed within the said period of time.

Example 3

Similarly to Example 2, a 50% dust of O,O-dimethyl-S-(4-oxobenzotriazine-3-methyl)-phosphorus dithioate was placed into bags of polyethylene and polyvinyl chloride with and without plasticiser additives. Flies which were placed on the bags in the same manner as in Example 2 were destroyed on the polyethylene bags to an extent of 100% within 5 hours. By contrast, only 60% were destroyed within 25 hours on the polyvinyl chloride with plasticiser, and 0% on the polyvinyl chloride without plasticiser.

We claim:

1. A process for preventing the evaporation of active ingredients comprising phosphorus containing compounds which comprises enclosing the active ingredients in polyvinyl chloride having no plasticiser additives.

2. The process according to claim 1 wherein the active ingredient is an insecticidally active composition containing dimethyl-2,2-dichlorovinyl phosphate.

3. The process according to claim 1 wherein the active ingredient is an insecticidally active composition containing dithiophosphoric acid-S-2(ethylthio)ethyl-O,O-diethyl ester.

4. The process according to claim 1 wherein the active ingredient is an insecticidally active composition containing O,O-dimethyl-S-(4-oxobenzotriazine-3-methyl)-phosphorus dithioate.

(References on following page)

References Cited

UNITED STATES PATENTS

| | | | |
|---|---|---|---|
| 2,186,183 | 1/1940 | Trumbull | 206—0.6 X |
| 2,876,927 | 3/1959 | Henning. | |
| 2,917,878 | 12/1959 | Carnarius et al. | 53—112 X |

FOREIGN PATENTS

| | | |
|---|---|---|
| 599,237 | 3/1948 | Great Britain. |
| 883,069 | 11/1961 | Great Britain. |

OTHER REFERENCES

Penn, W. S., PVC Technology, Maclaren and Sons, Ltd., London, 1962, p. 186 relied on.

Schildnecht, C. E., Vinyl and Related Polymers, John Wiley & Sons, Inc., New York, 1952, pp. 438–439 relied on.

TRAVIS S. McGEHEE, *Primary Examiner.*

FRANK E. BAILEY, *Examiner.*

L. S. BOUCHARD, *Assistant Examiner.*